UNITED STATES PATENT OFFICE.

JOHN M. CONROY AND FRED E. YOUNGS, OF ALLEGHENY, PENNSYLVANIA.

COATING THE BACKS OF SILVERED MIRRORS.

SPECIFICATION forming part of Letters Patent No. 290,745, dated December 25, 1883.

Application filed August 2, 1883. (No specimens.)

*To all whom it may concern:*

Be it known that we, JOHN M. CONROY and FRED E. YOUNGS, of Allegheny city, in the county of Allegheny, in the State of Pennsylvania, have discovered a new and useful improvement in coating the backs of silvered mirrors for their protection against atmospheric influences and mechanical injury; and we do hereby declare that the following is a full and exact description thereof.

Our invention consists in the employment of a coating of beeswax or other wax—whether animal, vegetable, or mineral—applied to the back of silvered mirrors by means of heat.

To enable others skilled in the art to make use of our invention, the following description of the method of its application is hereby given.

The silvered mirror is heated to a temperature sufficient to melt the wax, which is then spread evenly over the surface of the silver, and the mirror then allowed to cool.

We use heat in the application of the wax to the silver surface, in preference to any of its solvents, because when cooled all change ceases, whereas in the case of solvents the process of drying out is continuous, and the liability to crack and expose or injure the silver is constant.

The superiority of wax as a covering to the silvered surface of glass mirrors consists in the fact that it may be applied in a fused condition without the use of solvents, and when applied affords an air-tight covering, preventing the access of the atmosphere to the silver, while by its ductility it accommodates itself to the expansion and contraction caused by the ordinary changes of temperature without impairing the continuity of the silvered surface.

What we claim as our invention, and desire to secure by Letters Patent, is—

1. The method herein described of protecting the silvered surface of glass mirrors, consisting of the application to such silvered surface, by means of heat, of a covering of beeswax or other animal, mineral, or vegetable wax, or a substantially similar fusible substance having sufficient ductility to accommodate itself to the expansion and contraction occasioned by the ordinary changes of temperature without injury to the silvered surface, substantially as described.

2. A silvered glass mirror coated on the silvered surface with beeswax or other animal, vegetable, or mineral wax, or other substantially similar substance, forming an air-tight covering, substantially as described.

JOHN M. CONROY.
FRED E. YOUNGS.

Witnesses:
M. G. CLARK,
ISAAC STEWART.